United States Patent

[11] 3,540,677

[72] Inventors John William Johnson
Cromwell;
Horace Tom Hone, Trumbull, Connecticut
[21] Appl. No. 837,447
[22] Filed June 30, 1969
[45] Patented Nov. 17, 1970
[73] Assignee United Aircraft Corporation
East Hartford, Connecticut
a corporation of Delaware

[54] METHOD AND APPARATUS FOR LAUNCHING AND RETRIEVING BOATS AND PERSONNEL
11 Claims, 5 Drawing Figs.
[52] U.S. Cl............................................... 244/2,
244/137; 14/71
[51] Int. Cl............................................... B64d 1/08
[50] Field of Search......................................... 244/2, 114,
137; 9/11; 114/43.5, 230; 14/27, 71

[56] References Cited
UNITED STATES PATENTS
2,366,321  1/1945  Ferro............................  244/2
2,721,044  10/1955  Young............................  244/2
2,738,939  3/1956  Johnson..........................  244/137
2,969,210  1/1961  Richardson et al..............  244/137
3,181,823  5/1965  Gillmore........................  244/137
3,232,565  2/1966  Hackenberger, Jr...........  244/137

*Primary Examiner*—Milton Buchler
*Assistant Examiner*—C. A. Rutledge
*Attorney*—Maurice B. Tasker and Vernon F. Hauschild ABSTRACT: A buoyant boat carrier and launcher having slips for six boats is detachably secured beneath a helicopter by four cargo hoist cables, one adjacent each corner of the launcher, with the boats positioned in the launcher abreast of one another and crosswise of the longitudinal axis of the helicopter. Transfer of personnel is achieved with the helicopter hovering close to the water or floating on the water and with the launcher partly submerged alongside so that the boats are afloat. A folding ramp is provided in the helicopter which, when extended, provides a path for personnel between the helicopter and the floating boats.

Patented Nov. 17, 1970

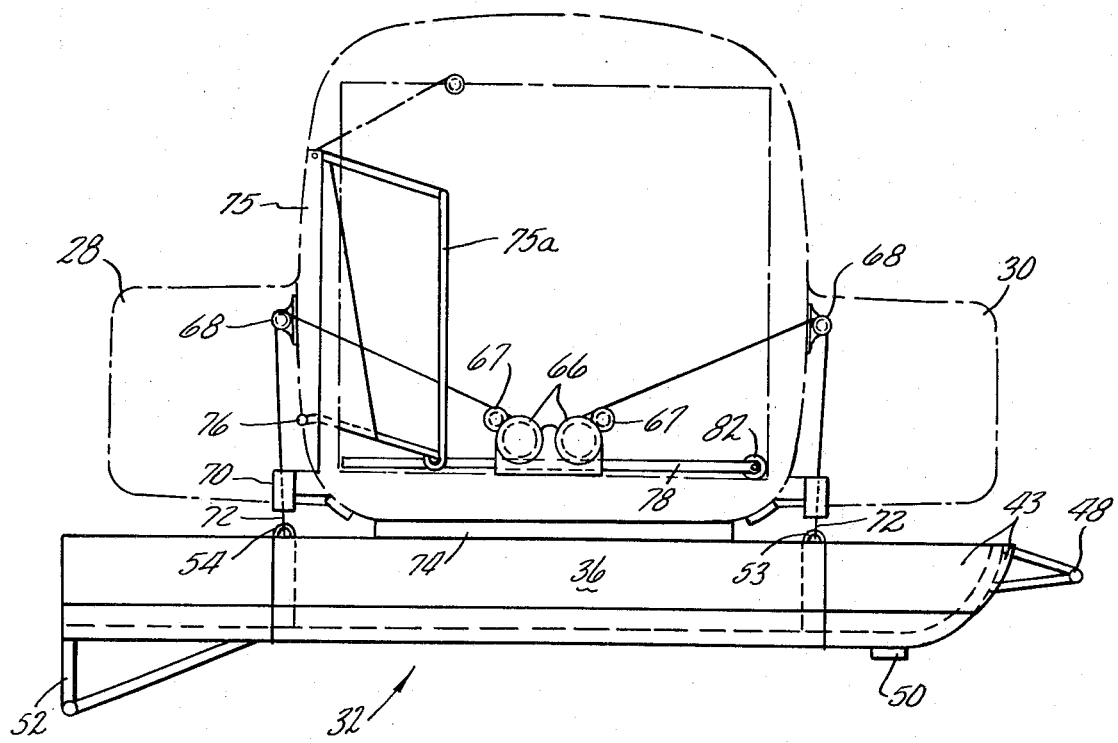

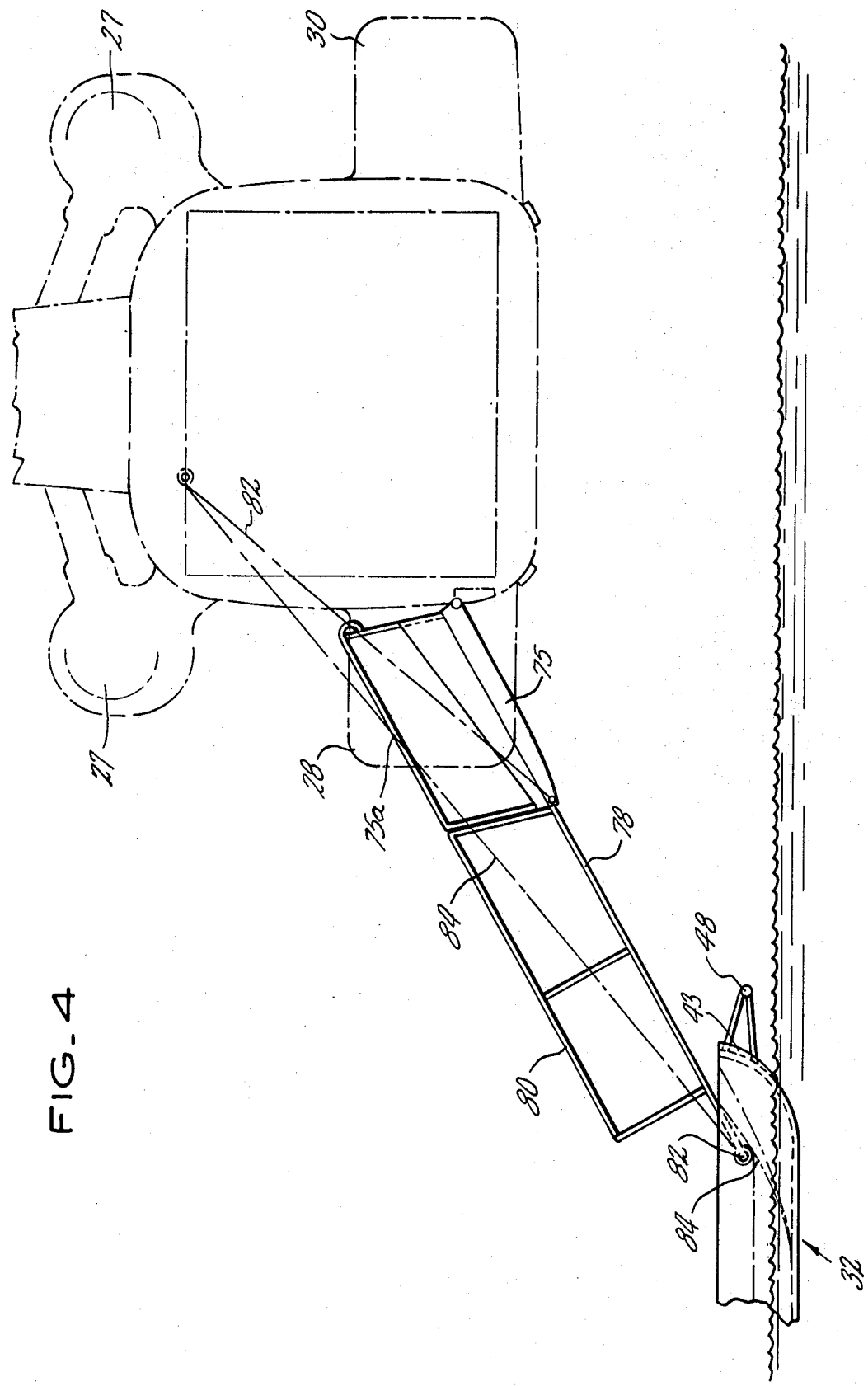

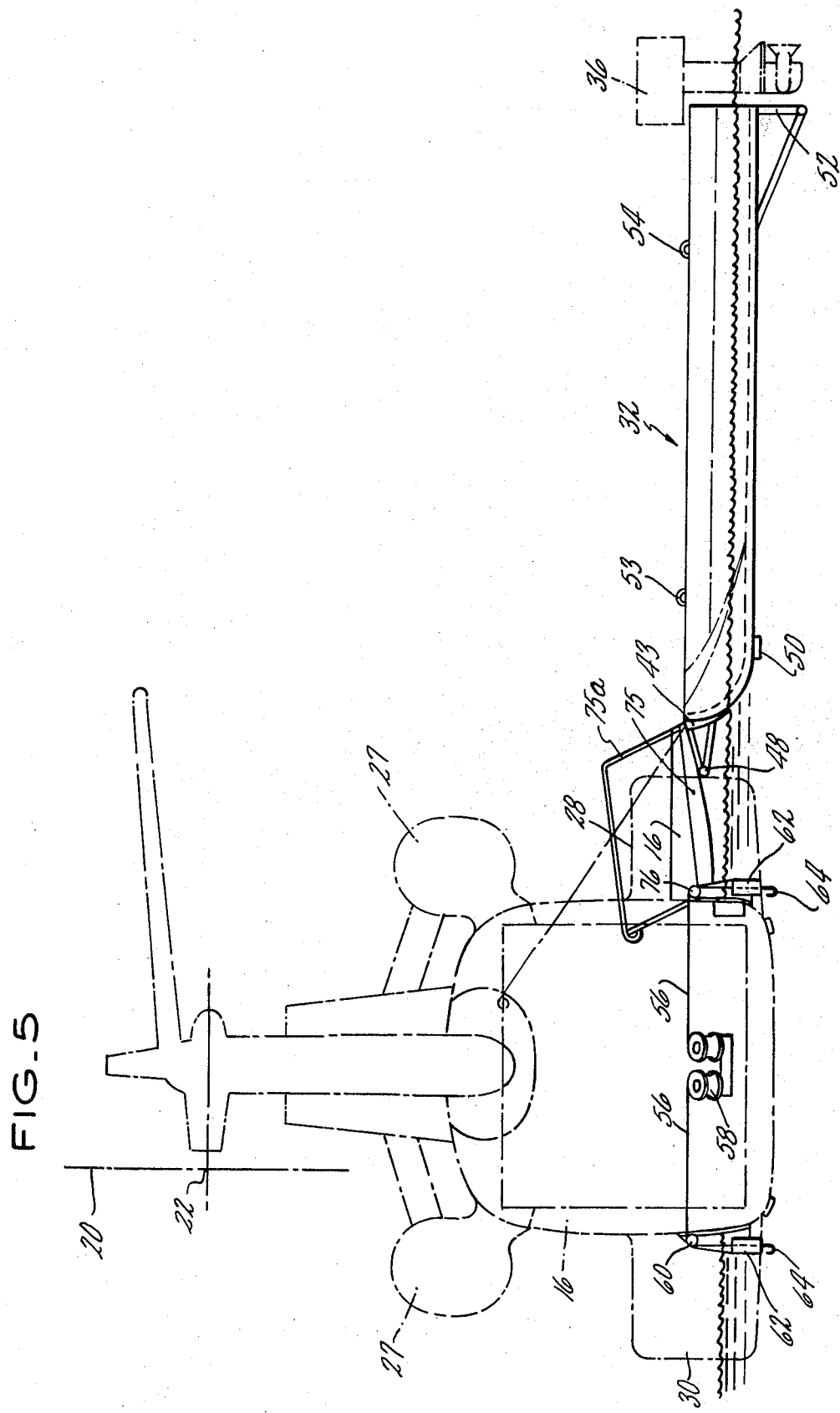

METHOD AND APPARATUS FOR LAUNCHING AND RETRIEVING BOATS AND PERSONNEL

The invention described herein was made in the course of or under a contract or subcontract thereunder with the Department of the Navy.

BACKGROUND OF THE INVENTION

Frequently in military operations where the terrain is dominated by waterways, such as deltas, lakes or rivers, cross-country mobility is drastically curtailed and the waterways must be exploited by the extensive use of boats in order to exercise control over the area. When suitable land sites are not available for combat bases and troops, command and support installations may be based on vessels from which operations are conducted by water. The ability to launch boats with their personnel quickly from a helicopter becomes highly desirable.

FIELD OF THE INVENTION

The present invention is well adapted for utilization with rotary wing aircraft of the general character disclosed in U.S. Design Pat. No. 197,823 which issued on Mar. 24, 1964.

DESCRIPTION OF THE PRIOR ART

It has been previously known to lower a detachable door at the bottom of an aircraft, which normally comprises a part of the outer skin of the fuselage, by means of cable and winch connections and to use this platform, which can be made semibuoyant, to load cargo into the aircraft. Such an arrangement is shown in U.S. Pat. No. 3,330,509, issued July 11, 1967 to R.J. Barchet.

U.S. Pat. No. 2,985,412, issued May 23, 1961 to R.L. Hart et al. shows a somewhat similar underwater cargo loading device in which multiple cables are used to raise the cargo-carrying pallet.

Also in helicopters equipped for personnel rescue work it has been known to use ramps hinged to the sides of the fuselage for bringing survivors aboard. Such an arrangement is shown in the U.S. Patents to K.B. Gillmore No. 3,181,823, issued May 4, 1965 and G.I. Hackenberger, Jr. No. 3,232,565, issued Feb. 1, 1966.

U.S. patent to Johnson No. 2,738,939, issued Mar. 20, 1956 shows another example of the use of a basket or litter, which is inserted from within the fuselage through the personnel door into a fork-shaped retriever external of the aircraft which is lowered on a hoist cable to the person in the water to be rescued.

None of these prior art devices is concerned with the present invention which relates to the launching and retrieval of personnel and boats from a helicopter.

SUMMARY OF THE INVENTION

The present invention is directed to a method and an apparatus for launching and retrieving a plurality of small assault type boats and related personnel by helicopter. In accordance with the invention a buoyant boat launcher having slips for a plurality of boats is carried on a plurality of cargo hoist cables externally of the aircraft beneath the fuselage. The boats are positioned in the launcher crosswise of the longitudinal axis of the helicopter and the launcher can be lowered by the cables into the water in which the launcher is sufficiently submerged to permit the loaded boats to float. Personnel enter and leave the boats by a ramp extended from within the helicopter.

It is a primary object of this invention to provide both improved means and a method for launching and retrieving boats and their personnel from a helicopter.

A further object is to accomplish these operations quickly and safely.

A still further object of this invention is to provide a means and a method by which the boat launcher and the personnel may be picked up or deposited on land or on a boat deck or may be transported in the boats.

An additional object is to provide a launcher of controlled buoyancy in which personnel and a number of boats may be transported to or from a helicopter.

A yet further object is to provide apparatus and a method applicable to amphibious helicopters by which the boats and personnel can be launched or retrieved while the helicopter is either hovering or afloat.

These and other objects and advantages of the invention will become evident from the following detailed description of a preferred embodiment of the invention illustrated in the accompanying drawings.

BRIEF DESCRIPTION OF THE DRAWINGS

FIG. 3 is a view taken through the helicopter just forward of the boat launcher looking aft, showing the latter in side elevation.

FIG. 4 is a similar view taken through the helicopter in the vicinity of the personnel door looking aft, showing the helicopter hovering with the ramp extended to the boat launcher which has been lowered and is floating alongside.

FIG. 5 is a view similar to FIG. 4 from the rear of the helicopter showing the latter afloat with the short door ramp extended to the boat launcher.

Referring to FIGS. 1 and 2, a helicopter shown in phantom lines is equipped with the boat carrier and launcher of this invention. The helicopter has a fuselage 10 which encloses a pilot compartment 12 and a cabin 14 for personnel. The cabin is provided with forward personnel doors 16 on the starboard side. A single lift rotor 18 is provided, and an antitorque rotor 20 is mounted on a generally horizontal shaft 22 carried by the usual empennage 24 at the end of tail cone 26.

Figures 1, 2:
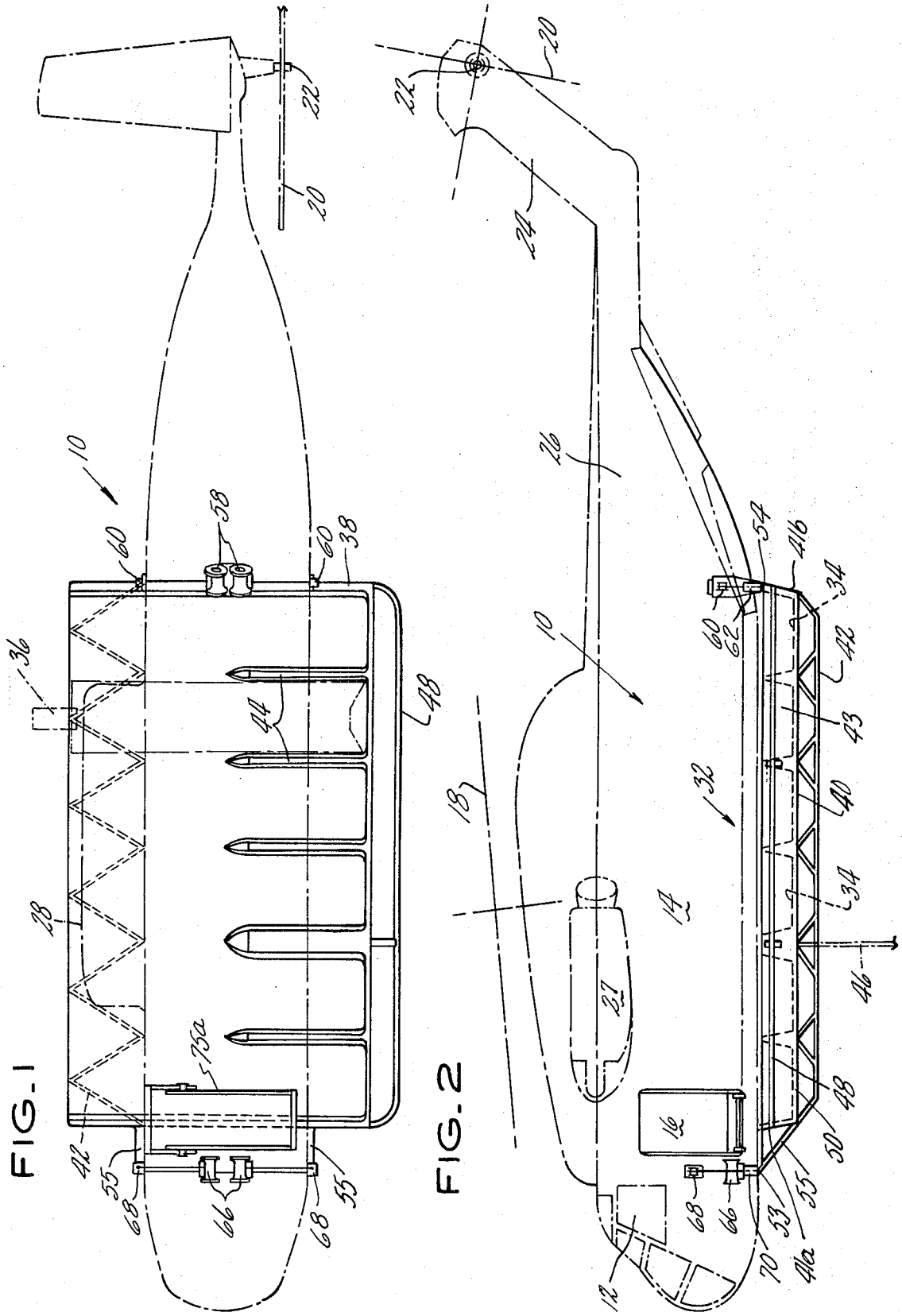
FIG. 1 is a plan view of a helicopter of the amphibian type equipped with the boat carrier and launcher of this invention, the helicopter being shown in phantom lines to facilitate illustration.
FIG. 2 is a side elevation of FIG. 1.

Two engine nacelles 27 are provided on opposite sides of the fuselage to house two gas turbine engines. The helicopter shown is of the amphibian type having floats or sponsons 28 and 30 (FIGS. 4 and 5). The helicopter is shown afloat in FIG. 5, buoyed up by its fuselage and floats 28 and 30. The boat launcher of this invention can be used, however, with other than amphibious helicopters as will become evident hereinafter.

The boat carrier and launcher 32 is a basically rectangular platform and when carried under the fuselage has its length dimension parallel with the aircraft longitudinal axis and is adapted to carry six assault type boats 34, shown dotted in FIG. 2, powered by outboard motors 36 (FIGS. 1 and 5). The boat carrier and launcher shown was designed for use with a CH-53 helicopter and has a platform approximately 18 feet wide and 28 feet long. The assault boats are carried on the platform at right angles to the aircraft longitudinal axis with the motors overhanging the platform. In carrying position under the aircraft the motors clear the starboard side sponson 28 so that the boats may be as close as convenient to the underside of the fuselage.

The boat carrier 32 comprises a shallow hull having a flat bottom 40, an upstanding side 41 on one long length side and upstanding sides 41a and 41b. The other length side of the hull is open for entrance and exit of the boats. The bottom is preferably of an open frame work or grid construction such that water drainage will occur immediately upon raising of the carrier from the water. The bottom is reinforced by an external stiffener and propeller guard assembly 42 which extends lengthwise of the bottom along the open side of the hull. Controlled buoyancy is provided by attachment of a flotation type substance to the upstanding sides of the carrier. Floatation, which may vary in amount and location with the load to be carried in the boats, is designed to float the carrier with its bottom submerged approximately 2 inches below the boats when they are fully loaded. The floatation may be sheets or blocks of cellular plastic secured to the hull as illustrated at 43. Since it is desired that the carrier submerge rapidly to float the boats in as short a time as possible, the floatation is preferably located on the upper portions of the carrier sides. This will provide a sudden increase in displacement as the carrier approaches its operational depth. Floatation may be of a tapered cross section as shown, with its thicker section at the top, or it may be of a collar-type configuration. With tubular or frame side members 41, 41a and 41b floatation blocks may be placed within the otherwise open spaces. As a less desirable alternative, floatation may be provided in spaced form on the bottom of the carrier, but this may detract from its capability to submerge instantly. As indicated drainage will occur through the open bottom and through its open side as it is lifted out of the water. Five transverse boat separators 44 are attached to the bottom 40 internally of the hull to provide slips for the six assault boats 34, it being noted that these separators, which are approximately 20 inches high, extend 8 feet across the carrier to form a half length slip for each boat. The separators are identical except that one, the second from the left in FIG. 1, is wider than the rest to accommodate a whip antenna 46 which normally depends in flight and which is swung up parallel with the bottom of the hull when the boat launcher is in the water. A second feature of the single wider separator is that it provides a wider space at the entry side of the carrier for the last boat to enter the carrier, thus providing greater freedom of maneuverability until its bow engages the separators.

A locating rail 48 is provided along the length side of the carrier which abuts the helicopter starboard float 28 during transfer of personnel when the helicopter is water borne (FIG. 5). Two lengthwise beams 50 and 52 (FIG. 5) are provided to reinforce the hull and provide skids for carrier deck landings. Two cable attachment rings 53 and 54 are provided on each side for attachment of winch cables. The two rings 53 are located at the corners of a rectangular frame 55 which extends from the side of the hull to lie directly beneath the forward helicopter hoist mechanism. The two rings 54 are located on the other side of the hull in alignment with the two attachment rings 53 and are located directly beneath the helicopter. As best shown in FIG. 5, two like winch cables 56 extend over pulleys 58 and 60, through cable cutters 62 and terminate in hooks 64 which engage the forward attachment rings 54.

The forward hoist mechanism, which is located slightly ahead of the side of the hull, is shown in FIG. 3. Here the cables from the winch pass over pulleys 66, 67 and 68, through the cable cutters 70, and terminate in hooks 72 which engage the cable attachment rings 53.

A buffer pad 74 (FIG. 3) is provided between the fuselage and the carrier against which the carrier is secured by cable tension during flight.

Transfer of personnel between the boats and the helicopter is achieved by means of ramps carried internally of the helicopter. In the event that the transfer is made while the helicopter is waterborne, a short ramp 75 is used which comprises the starboard door 16 of the helicopter. For this purpose the door 16 is hinged at its lower edge on the fuselage at 76 and is swung outwardly from the top to rest on locating rail 48 as shown in FIG. 5. The door ramp 75 has side hand rails 75a which fold with it.

When the helicopter is airborne, as shown in FIG. 4, and it is desired to transfer personnel either to or from the boats a longer ramp 78 is provided which is an extension of door ramp 75. Ramp 78, which in the embodiment shown is 9 feet long, is normally stored in a horizontal position across the floor inboard of the door (FIG. 3) with left and right side hand rails 80 folded inwardly to lie on top of it. The extension ramp has a pair of small wheels 82 at its outboard end and has provision at its inboard end for pivoting it to the free end of door ramp 75. After the extension ramp has been attached to ramp 75 and has been swung outwardly the hand rails 80 are unfolded into the FIG. 5 position. Ramp 75 is extended and retracted by cables 82. Similar cables 84 are provided to extend and retract the extension ramp 78. When the ramp 75 and the extension ramp 78 are in extended position the rollers 82 rest on the curved surface 84 adjacent the bow of one of the boats 34 to guide and support the outboard end of the ramp as the carrier and the helicopter move relative to each other during loading. When extended and locked the ramp is free to rotate about the door hinge 76 through an angle of 45° from the horizontal to accommodate a hover altitude fluctuation between 1 and 10 feet while the ramp slope varies from near horizontal to −45°.

A helicopter equipped with the boat carrier and launcher of this invention has great flexibility in the use of the troops assigned to it. The helicopter illustrated with its six Mark II assault boats and 26 or more troops with their weapons can operate from land, from ship deck or waterborne bases. It can acquire and transfer the combat load while the aircraft is airborne or waterborne. It can accomplish the transfer of personnel to or from the boats while the aircraft is at rest or in motion with a minimum of exposure time in the mission loading zone.

To carry out a typical airborne launching operation, the helicopter approaches the launch site with the carrier in place beneath its fuselage. When over the site the helicopter hovers while the boat carrier is lowered by extending the hoist cables. When the carrier is in the water, the helicopter moves laterally to port to bring the boat carrier on the starboard side of the helicopter, and the cables are winched in to position the carrier alongside the helicopter. Frequently wind or water currents can be used to advantage in positioning the carrier relative to the helicopter. While the helicopter is moving into this position alongside the carrier the crew will have attached the extension ramp to the door ramp and when the helicopter is in the correct position relative to the carrier, the ramp is lowered into engagement with the carrier. The ramp is 4 feet wide and its surface is treated for good traction and transfer of the personnel takes place quickly, the outboard motor operators and the machine gunners taking their places in the boats first. The boats, because of the controlled buoyancy of the carrier, are afloat in the slips ready to back out and proceed on the mission. The airborne retrieval of the troops is accomplished by similar steps taken in reverse order. In docking the boats in the carrier a definite procedure is observed. The two end boats enter the slips first guided by the sides of the carrier and the adjacent separators. The third, fourth and fifth boats are guided in by the sides of the preceding boats. The last boat is guided in by personnel in adjacent boats, the space alloted for the last boat being larger for greater maneuverability due to the single wider separator.

A waterborne operation is very similar. The helicopter lowers the carrier into the water from about 100 feet above the water and then moves laterally to port to bring the carrier onto its starboard side. The helicopter then alights on the water and shortens the cables to bring the locating rail 48 into engagement with float 28. The door ramp is then swung out and down to rest upon rail 48.

The helicopter illustrated has counter clockwise rotating main rotor blades with its antitorque rotor on its port side. Consequently, for safety reasons, in the launching of the boats and transfer of personnel above described, the boat carrier is operated on the starboard side of the helicopter. If a clockwise rotating main rotor were used, the above operations would take place on the port side of the helicopter.

The boat carrier can be picked up on land or in the water. Also the helicopter can carry the boat launcher with troops in it by lowering the cables while hovering over the launcher, shortening the cables to bring the launcher to a point just short of the usual transporting position, and proceeding to its mission.

We claim:

1. In combination, a helicopter having a fuselage including a cabin provided with an access door, a cargo hoist having a plurality of cables depending from said fuselage, a boat carrier and launcher comprising a controlled buoyancy hull having attaching means for said hoist cables, a plurality of boats in said carrier arranged abreast of each other transverse to the longitudinal axis of said helicopter, and means for transferring personnel between said boats and said helicopter cabin when said carrier and launcher is in the water including an extensible ramp carried by said helicopter in the vicinity of said access door.

2. The combination of claim 1 in which the boat carrier and launcher comprises a shallow generally rectangular hull having a generally flat bottom having upstanding sides, at least one side being open for passage of the boats in and out, and floatation means carried by said carrier for supporting it in the water with its bottom sufficiently beneath the surface of the water to permit said boats to float.

3. The combination of claim 1 in which a bumper pad is carried by the fuselage between the latter and the boat carrier against which the carrier is held by tension of said hoist cables during transport of the carrier.

4. The combination of claim 2 in which separators are provided upstanding from the bottom of said hull and extending perpendicular to the aircraft longitudinal centerline to provide a plurality of slips for the boats.

5. The combination of claim 4 in which a locating rail is provided externally of the hull and the separators extend approximately half way across the width of the hull.

6. The combination of claim 1 in which the extensible ramp includes the closure member for the access doorway having a hinged connection with the fuselage at its bottom edge and an extension pivoted to the top edge of said closure member and extensible therebeyond.

7. The combination of claim 6 in which the closure member has rigid side hand rails, and the extension has similar hand rails pivoted thereto and foldable inwardly over the top thereof for storage in the helicopter across the floor of the latter in the vicinity of the access door.

8. Apparatus according to claim 1 and including floatation means connected to said boat carrier.

9. The method of launching a plurality of boats from a helicopter having a boat carrier suspended therebeneath by means of a plurality of hoist cables, which consists in hovering the helicopter over the launch site, lowering the boat carrier into the water by means of the hoist cables, moving the helicopter sidewise while descending to a position alongside the carrier, drawing the boat carrier toward the helicopter by means of the hoist cables, extending a ramp from the helicopter to engage the boat carrier, and transferring personnel from the helicopter to the boats.

10. The method of launching a plurality of boats from an amphibious helicopter comprising the steps of suspending a boat carrier and launcher beneath the fuselage of the helicopter by a plurality of hoist cables with the boats in the carrier abreast of each other and transverse to the longitudinal axis of the helicopter, hovering over the launch site, lowering the boat carrier into the water by means of the hoist cables, moving the helicopter sidewise into a position in front of the boats, alighting on the water, reeling in the cables to draw the carrier toward the helicopter, extending a ramp from the helicopter to the carrier, and discharging personnel from the helicopter into the boats.

11. The method of launching and retrieving a plurality of boats with troops from a helicopter comprising the steps of picking up a boat carrier by means of a plurality of hoist cables, raising it into transport position beneath the fuselage, transporting the boat carrier to the launch site, hovering above the surface of the water, lowering the boat carrier into the water, moving the helicopter laterally into a position at one side of the carrier while lowering the helicopter to an altitude slightly above the surface of the water, winching in the hoist cables to bring the carrier alongside the helicopter, extending a ramp from the helicopter to the carrier, discharging personnel from the helicopter to the boats while the helicopter hovers, and subsequently, following completion of the mission, performing the above steps in the reverse order to retrieve the personnel and return the carrier to transport position.